United States Patent
Lim (10) Patent No.: US 7,116,641 B2
(45) Date of Patent: Oct. 3, 2006

(54) MULTICAST AND BROADCAST TRANSMISSION METHOD AND APPARATUS OF A CDMA MOBILE COMMUNICATION NETWORK

(75) Inventor: Byung Keun Lim, Kyungki-Do (KR)

(73) Assignee: LG Electronics Inc., Seoul (KR)

(*) Notice: Subject to any disclaimer, the term of this patent is extended or adjusted under 35 U.S.C. 154(b) by 886 days.

(21) Appl. No.: 09/987,761

(22) Filed: Nov. 15, 2001

(65) Prior Publication Data

US 2002/0057663 A1 May 16, 2002

(30) Foreign Application Priority Data

Nov. 15, 2000 (KR) .............. 2000-67666
Nov. 15, 2000 (KR) .............. 2000-67667

(51) Int. Cl.
*H04L 12/28* (2006.01)

(52) U.S. Cl. .............. 370/254; 370/255; 370/313; 370/328; 370/335; 455/39; 455/433; 455/426.1; 455/524

(58) Field of Classification Search ............. 370/254, 370/255, 310, 313, 328, 335, 338, 342; 455/39, 455/433, 426.1, 524
See application file for complete search history.

(56) References Cited

U.S. PATENT DOCUMENTS 6,148,422 A * 11/2000 Strawczynski et al. ..... 714/704
6,850,494 B1 * 2/2005 Bender ....................... 370/254
6,876,640 B1 * 4/2005 Bertrand et al. ............ 370/331

* cited by examiner

*Primary Examiner*—Chi Pham
*Assistant Examiner*—Raj Jain
(74) *Attorney, Agent, or Firm*—Fleshner & Kim, LLP (57) ABSTRACT

A transmission method and system that receive packet data destined to multiple subscribers served by a base station controller/packet control function (BSC/PCF) with the BSC/PCF, transmit the packet data from the BSC/PCF to a number of base stations, which provide service to the subscribers, using a single communication link between the BCS/PCF and each of the number of base stations, and transmit the packet data from the number of base stations to the subscribers.

28 Claims, 7 Drawing Sheets

MULTICAST AND BROADCAST TRANSMISSION METHOD AND APPARATUS OF A CDMA MOBILE COMMUNICATION NETWORK

BACKGROUND OF THE INVENTION

1. Field of the Invention

The present invention relates to a packet data transmission method in a CDMA mobile communication network and, more particularly, to a multicast and broadcast transmission method.

2. Background of the Related Art

Recently, with the remarkable development in mobile communication technology, mobile communication service providers have begun providing subscribers with improved functions and various kinds of services. The mobile communication service is expanding its service into the service area previously provided only by wired communication. In addition, research on faster and more effective methods and techniques is being conducted with respect to the transmission of service.

A multicast, one of multi-address calling, denominates a communication form made between one transmission side and a plurality of receiving sides in a network. For example, a multicast communication is like transmitting an e-mail message to all of the addresses stored in an address book. Multicasting is mostly used for teleconferencing, such as video-conferencing or audio-conferencing, in which one transmission party transmits an image or voice to a plurality of selected receiving-party sites. In the case of video-on-demand (VOD), a server transmits an image to a plurality of subscribers' set-top boxes. The multicast transmission method is currently used for mobile communication as a method for providing an e-mail receiving service to a subscriber or transmitting specific contents to a subscriber group. A broadcast is a method for transmitting the same data to a plurality of unspecified terminals. Contrasted with the multicast, a unicast is a communication form made between one transmitting party and one receiving party.

Figure 1:
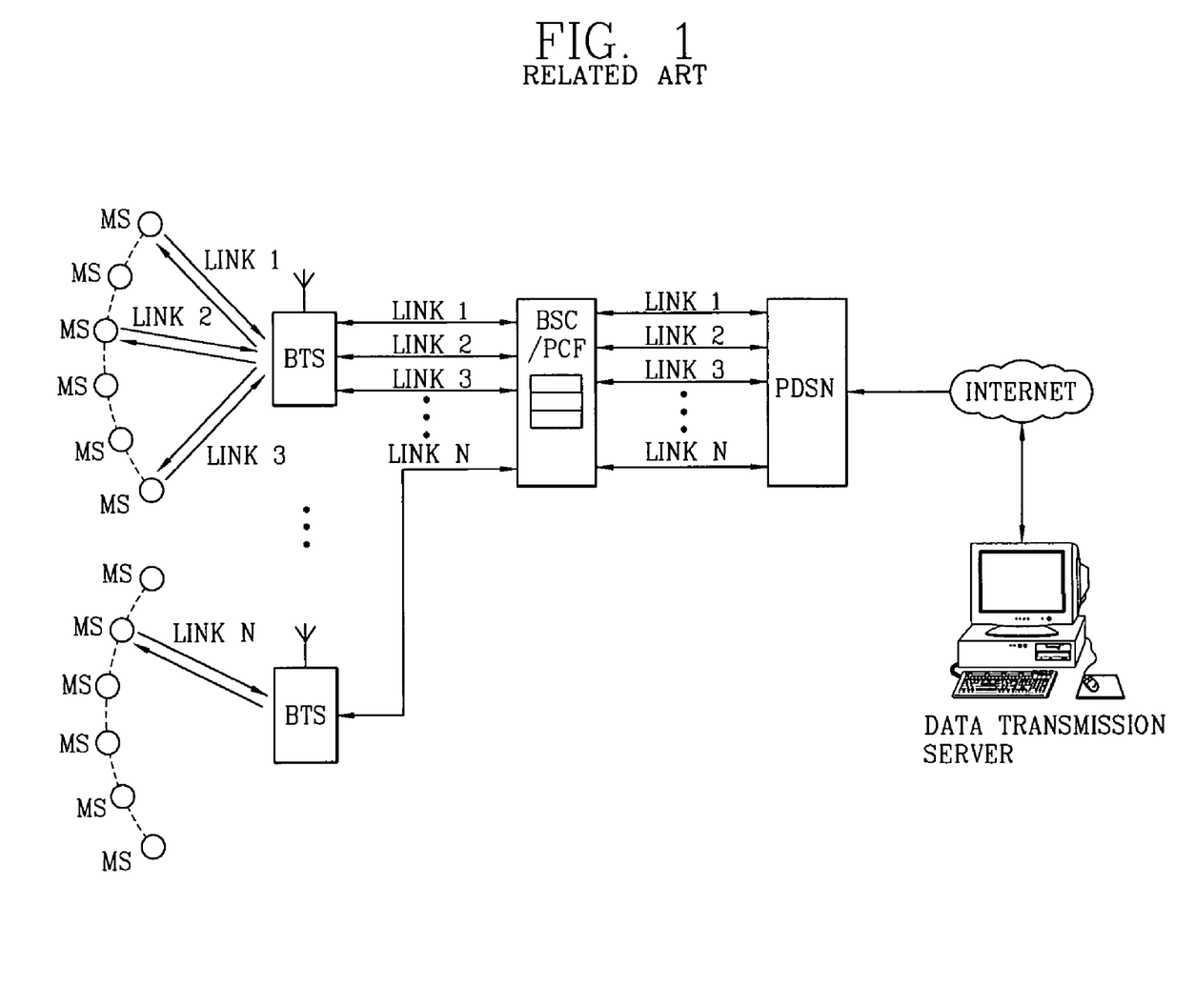
FIG. 1 illustrates a multicast/broadcast transmission in a CDMA mobile communication network, in accordance with the related art.

FIG. 1 is a drawing conceptually illustrating a multicast or a broadcast transmission in a CDMA mobile communication network, in accordance with the related art. In the case that an Internet server intends to transmit packet data to every terminal (or mobile station) of a mobile communication system network or to a plurality of mobile stations (MSs) of a particular multicast group, an IP datagram is transmitted to an MS by a multicast (or broadcast) method using a common signal channel or by a multicast (or broadcast) method through a PPP link. The base station controller (BSC) and the packet control function (PCF) are independent equipment, but for the sake of explanation, they are shown as one equipment block in the drawing.

The multicast (or broadcast) method using a common signal channel is not suitable for transmitting high speed multimedia, due to the channel's low speed and because the signal channel may be overloaded.

As for the multicast (or broadcast) method through the PPP link, which uses a similar transmission method and path to the unicast transmission, a packet data serving node (PDSN) sets an individual link to every target MS and transmits the multicast data.

Accordingly, when an arbitrary server multicasts or broadcasts data to a plurality of MSs on the Internet, since target MSs of the mobile communication network individually occupy a radio traffic channel, the multicasting method differs little from an individual line connection at the side of the mobile communication network.

Figure 2:
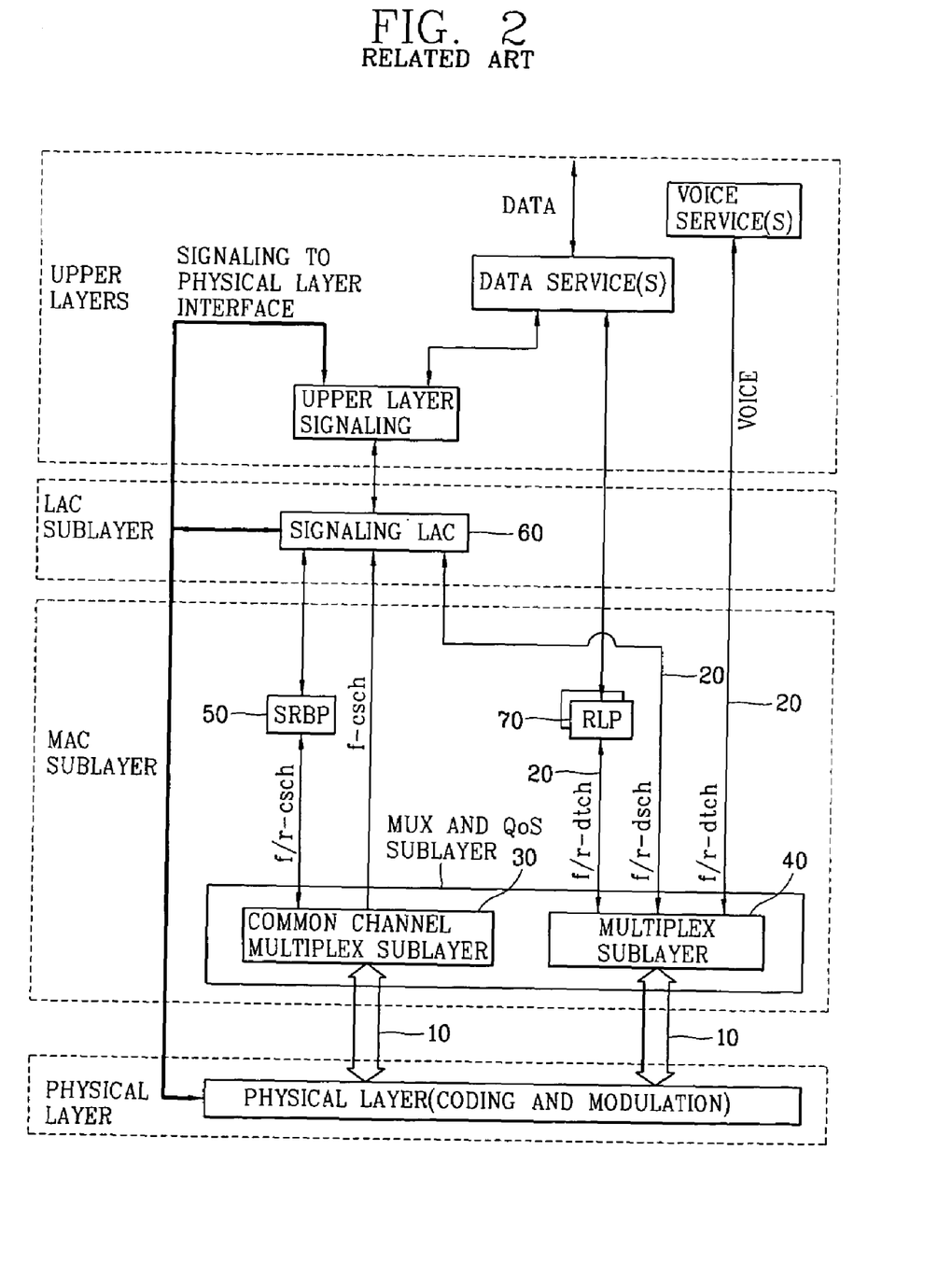
FIG. 2 illustrates a service connection from a mobile station view between radio protocol objects of a CDMA mobile communication system, in accordance with the related art.

FIG. 2 is a drawing illustrating a service connection (from an MS view) between radio protocol objects of a CDMA mobile communication system. The functional object of a radio protocol and a service interface includes a physical channel object 10, such as a common assignment channel (CACH), a common power control channel (CPCCH), a pilot channel (PCH), a common control channel (CCCH), a sync channel (SYNC), a fundamental traffic channel (FCH), a supplemental channel (SCH), a dedicated control channel (DCCH), a reverse access channel (R-ACH), a reverse enhanced access channel (R-EACCH), a broadcast control channel (BCCH), and a paging channel (PCH). The functional object of the radio protocol and the service interface also includes a logical channel object 20, such as a common signaling channel (csch) for transmitting a common signal, a dedicated signaling channel (dsch) for transmitting a control signal with an assigned MS, and a dedicated traffic channel (dtch) allocated to an assigned MS, for transmitting user data.

The multiplex and QoS sub-layer is positioned between the physical channel and the logical channel. This sub-layer includes a common channel multiplex sub-layer 30, which handles the common channel, and a multiplex sub-layer 40, which handles an individual channel assigned to the MS and controls the data multiplexing/demultiplexing of the logical channel and the physical channel. The multiplex and QoS sub-layer further controls a transmission quality.

A signaling radio burst protocol (SRBP) 50 is positioned between a signaling link access controller (LAC) 60 and the common channel multiplex sub-layer 30 and controls the processing of the radio frame data of a signaling message.

A radio link protocol (RLP) 70 controls an individual channel transmission so that the individual channel transmission of the packet data is reliable. The signaling LAC 60 controls the transmission process, so that a message of an upper signaling layer can be reliably transmitted to the other party, and also controls the authentication of a message.

The MS and the Base Station Transceiver Subsystem (BTS) transmit to and receive from each other a signal layer message of an upper layer and individual transmission data through a LAC sub-layer, a media access controller (MAC) sub-layer, and the physical layer. That is, the function object and the service interface of the radio protocol only include a forward/backward individual signal channel (f/r-dsch) and a forward/backward common signal channel (f/r-csch) for transmitting an MS control signal and a BTS information signal. Additionally, the function object and service interface only have a forward/backward individual channel (f/r-dtch) for individually transmitting data to a particular MS. The BTS necessarily has the physical channel, but the other channels in the middle process may exist in the BTS or the BSC according to a particular implementation.

The related art multicast service has many problems. For example, in the case that the Internet server multicasts (or broadcasts) to the MS of the mobile communication network, since every MS individually occupies the radio traffic channel, radio resources are substantially wasted. In addition, since a wired resource of a wired BTS-BSC/PCF-PDSN is occupied for every MS receiving the multicast (or broadcast), the occupancy of a separate radio traffic channel by every MS is very inefficient for the multicasting/broadcasting transmission, when transmitting the same message to a plurality of target MSs.

SUMMARY OF THE INVENTION

An object of the invention is to solve at least the above problems and/or disadvantages and to provide at least the advantages described hereinafter.

Another object of the present invention is to provide a multicast and broadcast transmission method, of a CDMA mobile communication network, that is capable of reducing a load burden at the side of a wired resource (BTS-BSC/PCF-PDSN).

A further object of the invention is to reduce the load burden of the wired resource by adding a channel and a radio protocol object for multicast/broadcast (M/B) data to the side of a radio resource (MS-BTS).

To achieve at least the above objects in whole or in part, there is provided a multicast and broadcast transmission method of a CDMA mobile communication network. The method includes receiving M/B packet data of a different network server transmitted from a PDSN, without setting a link between a packet data serving node (PDSN) and target mobile stations (MS) in a multicast/broadcast transmission (M/B) of a mobile communication network; temporarily storing the received M/B packet data, performing an error control procedure and transmitting it to a plurality of MSs through an M/B packet data dedicated channel; and receiving and processing only M/B packet data by only the target MS, by referring to header information of the M/B packet data received from the base station side.

To achieve at least the above objects in whole or in part, there is provided a transmission method, including receiving packet data destined to multiple subscribers served by a base station controller/packet control function (BSC/PCF) with the BSC/PCF; transmitting the packet data from the BSC/PCF to a number of base stations, which provide service to the subscribers, using a single communication link between the BCS/PCF and each of the number of base stations; and transmitting the packet data from the number of base stations to the subscribers.

To achieve at least the above objects in whole or in part, there is provided a communication method, including receiving a multicast or broadcast message transmitted with a subscriber through a common channel and determining, with the subscriber, whether the subscriber is an intended recipient of the multicast or broadcast message, based on header information within the multicast or broadcast message.

To achieve at least the above objects in whole or in part, there is provided a communication method, including receiving packet data destined to multiple subscribers served by a base station controller/packet control function (BSC/PCF) with the BSC/PCF; transmitting the packet data from the BSC/PCF to a number of base stations, which provide service to the subscribers, using a single communication link between the BCS/PCF and each of the number of base stations; communicating the packet data from the number of base stations to the subscribers; and determining, with each of the subscribers, whether the subscriber is an intended recipient of the packet data, based on header information within the packet data.

To achieve at least the above objects in whole or in part, there is provided a communication method, including a packet data serving node (PDSN) that receives a multicast or broadcast message from a remote server as packet data; a base station controller/packet control function (BSC/PCF) means for receiving the packet data, destined to multiple subscribers associated with the BSC/PCF means, from the PDSN through a single communication link; and a number of base stations, which provide service to the subscribers, that receive the packet data from the BSC/PCF means through a single communication link between the BCS/PCF means and each of the number of base stations. Each of the number of base stations transmits the packet data to the subscribers within the base station's coverage area through a common channel. Also, each of the subscribers determines whether the subscriber is an intended recipient of the packet data, based on header information within the packet data, and no link is established between the PDSN and any specific one or more of the subscribers.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
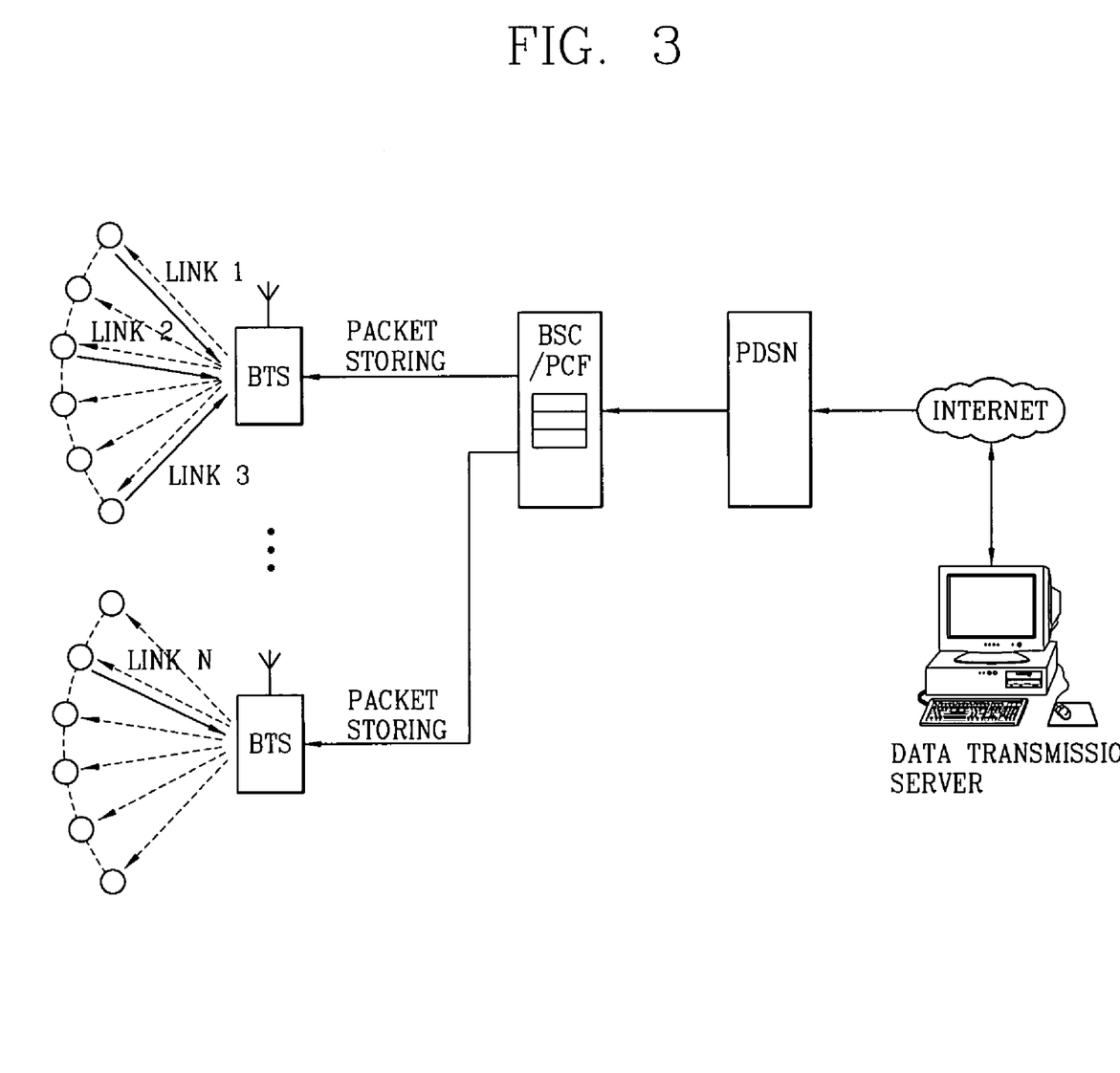
FIG. 3 illustrates a multicast transmission in a CDMA mobile communication network, in accordance with a preferred embodiment of the present invention.

FIG. 3 is a drawing conceptually illustrating a multicast transmission in a CDMA mobile communication network, in accordance with a preferred embodiment of the present invention. When the PDSN receives multicast data from an Internet server, it transmits the received multicast data through a BSC/PCF to the BTSs. Unlike the related art PDSN, which sets a link individually for every target MS in the transmission of multicast data, the PDSN of the present invention transmits multicast data to each BTS without setting a link with a target MS, when the PDSN receives the multicast data.

The BTS transmits the received data to every MS within a service area and temporarily stores it in a buffer. The MS checks whether the multicast/broadcast (M/B) data has been transmitted from a multicast group to which it belongs and receives only data from its subscribed group.

If some of the M/B data received by the MS causes an error, the MS requests a re-transmission of the corresponding data from the BTS. Then, the BTS re-transmits only the corresponding data, among the M/B data stored in the buffer.

In this manner, the channel for the M/B data and the radio protocol object are added to the radio resource (MS-BTS) side to thereby considerably reduce the load burden at the wired resource (BTS-BSC/PCF-PDSN) side.

Figure 4:
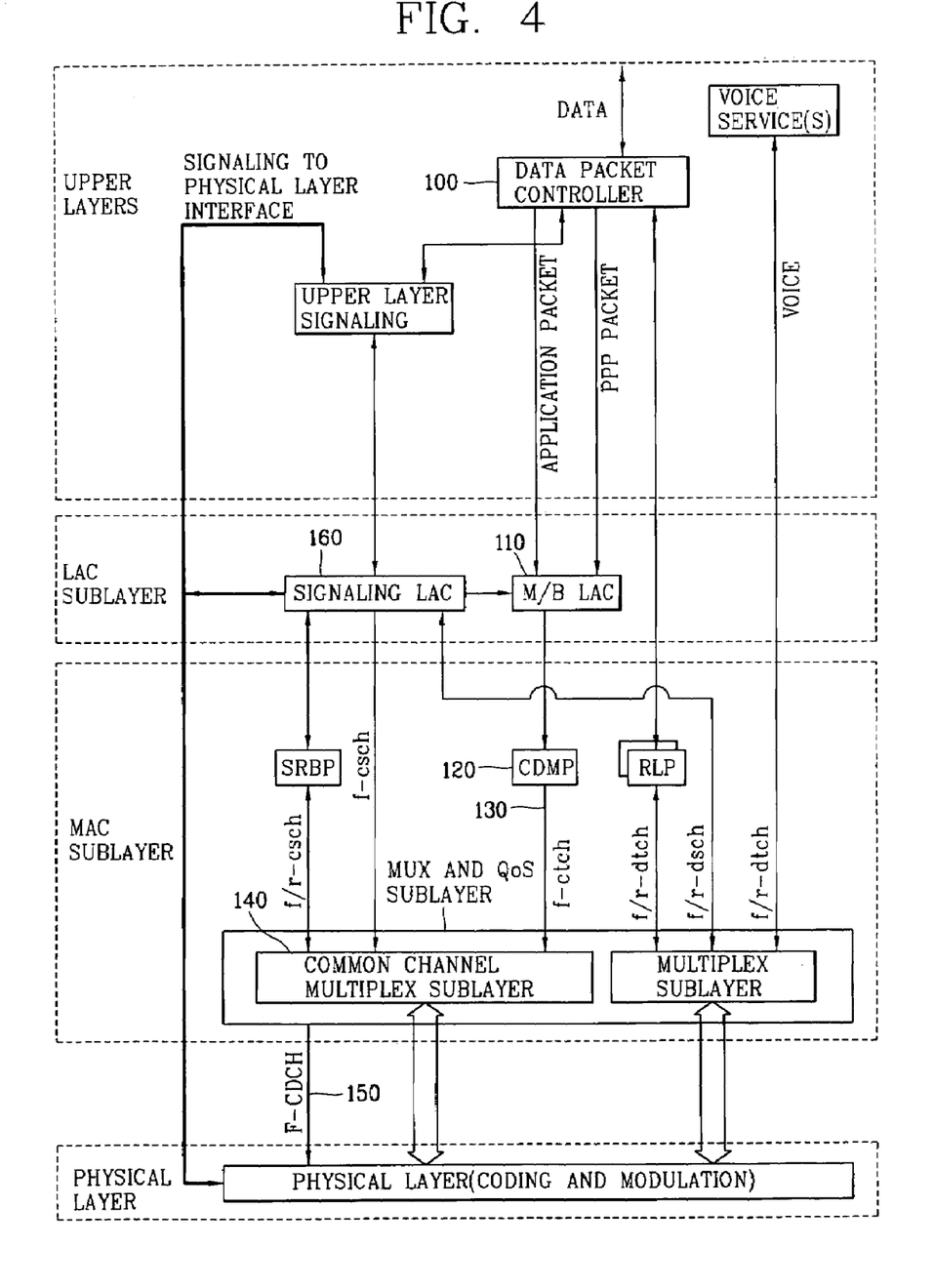
FIG. 4 illustrates a service connection between radio protocol objects viewed from a base station transceiver of the CDMA mobile communication system, which service connection provides a radio packet multicasting/broadcasting in accordance with the preferred embodiment of the present invention.
Figure 5:
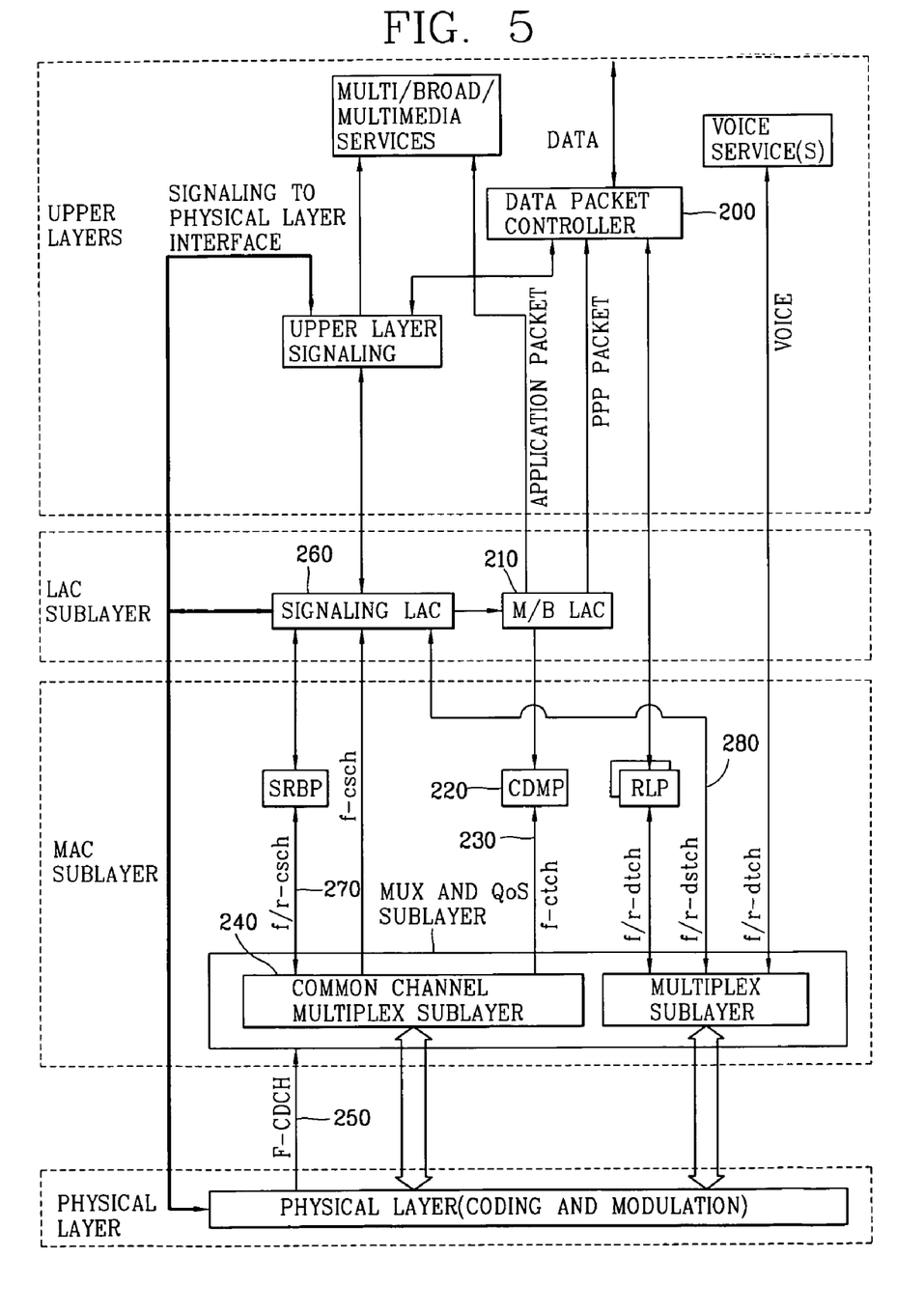
FIG. 5 illustrates a service connection between radio protocol objects, viewed from a mobile station of the CDMA mobile communication system, which service connection provides radio packet multicasting/broadcasting in accordance with the preferred embodiment of the present invention.

FIG. 4 is a drawing illustrating a service connection between radio protocol objects, viewed from a BTS of the CDMA mobile communication system, which provides a radio packet multicasting/broadcasting in accordance with the preferred embodiment of the present invention. FIG. 5 is a drawing illustrating a service connection between radio protocol objects, viewed from an MS of the CDMA mobile communication system, which provides a radio packet multicasting/broadcasting in accordance with the preferred embodiment of the present invention.

As shown in FIG. 4, the BTS-side function object for the radio packet data multicast/broadcast transmission preferably includes a data packet controller 100 for identifying M/B packet data and general packet data and setting an internal process routine when packet data is received from the PDSN. The BTS-side function object also includes an M/B LAC 110 for receiving the M/B packet data from the data packet controller 100 and outputting a cellular data multicasting protocol service data unit (CDMP SDU), generated by adding a link header to the M/B packet data. Additionally, the BTS-side function object includes a CDMP 120 for receiving the CDMP SDU, segmenting the CDMP SDU into a plurality of data units, and outputting a CDMP protocol data unit (PDU), generated by adding a multicast header to each separated data unit, to a forward common traffic channel (f-ctch) 130. Moreover, the BTS-side function object includes a common channel multiplex sub-layer 140 for segmenting the CDMP PDU, inputted through the f-ctch 130, into data units each with a Mux PDU type 3 size and transmitting an F-CDCH SDU, generated by adding a Mux header and a CRC code to each segmented data unit, to the MS through a forward common data channel (F-CDCH )150.

As a logical channel for transmitting common traffic to a forward direction, the f-ctch 130 transmits the M/B packet data from the CDMP 120 to the common channel multiplex sub-layer 140. The F-CDCH 150 is a physical channel set for accessing every MS within a subscribed area.

As shown in FIG. 5, the MS-side function object for a radio packet data multicast/broadcast preferably includes a common channel multiplex sub-layer 240 for removing the Mux header and the CRC code from the F-CDCH SDU, which is received through the F-CDCH 250. The MS-side function object also includes a CDMP 220 for extracting only CDMP PDUs of the multicast group for which the corresponding MS has subscribed, among the CDMP PDUs inputted through the f-ctch 230. The CDMP 220 also removes the multicast header of the CDMP PDUs and outputs a CDMP SDU block indicating that the CDMP PDUs are aligned in good order. The MS-side function object also includes an M/B LAC 210 for receiving the CDMP SDU block, completing the original CDMP SDU block without omission of any data unit, and outputting packet data without a link header, by removing the link header contained in the CDMP SDU block. Additionally, the MS-side function object includes a data packet controller 200 for transmitting the packet data received from the M/B LAC 210 to an upper application layer.

As a logical channel for transmitting the common traffic to a forward direction, the f-ctch 230 transmits the M/B packet data from the common channel multiplex sub-layer 240 to the CDMP 220. The F-CDCH 250 is a physical channel set for receiving the M/B packet data, which the BTS has transmitted to a plurality of unspecified MSs.

Figure 6:
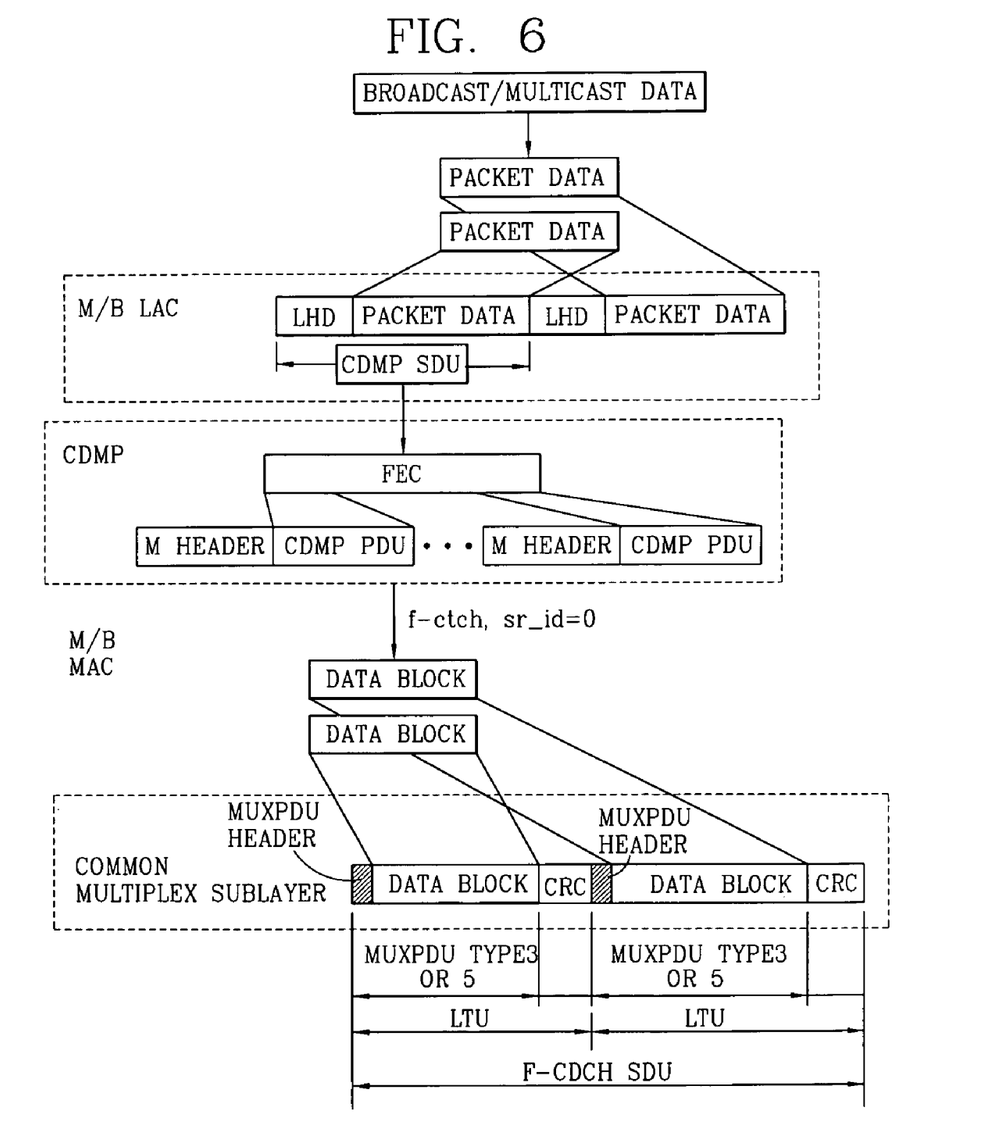
FIG. 6 illustrates an example of a packet broadcast/multicast data protocol architecture, from the view of a base station transceiver/base station controller, in accordance with the preferred embodiment of the present invention.
Figure 7:
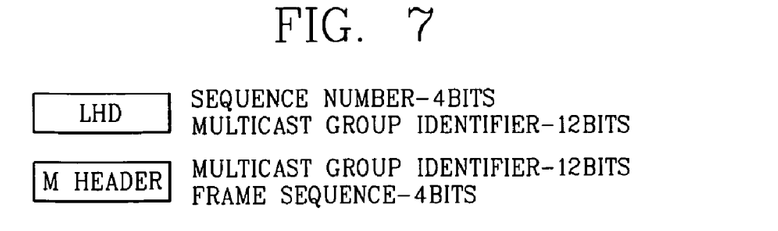
FIG. 7 illustrates an example of a multicast/broadcast link access controller header and a multicast/broadcast medium access controller header in accordance with the preferred embodiment of the present invention.
Figure 8:
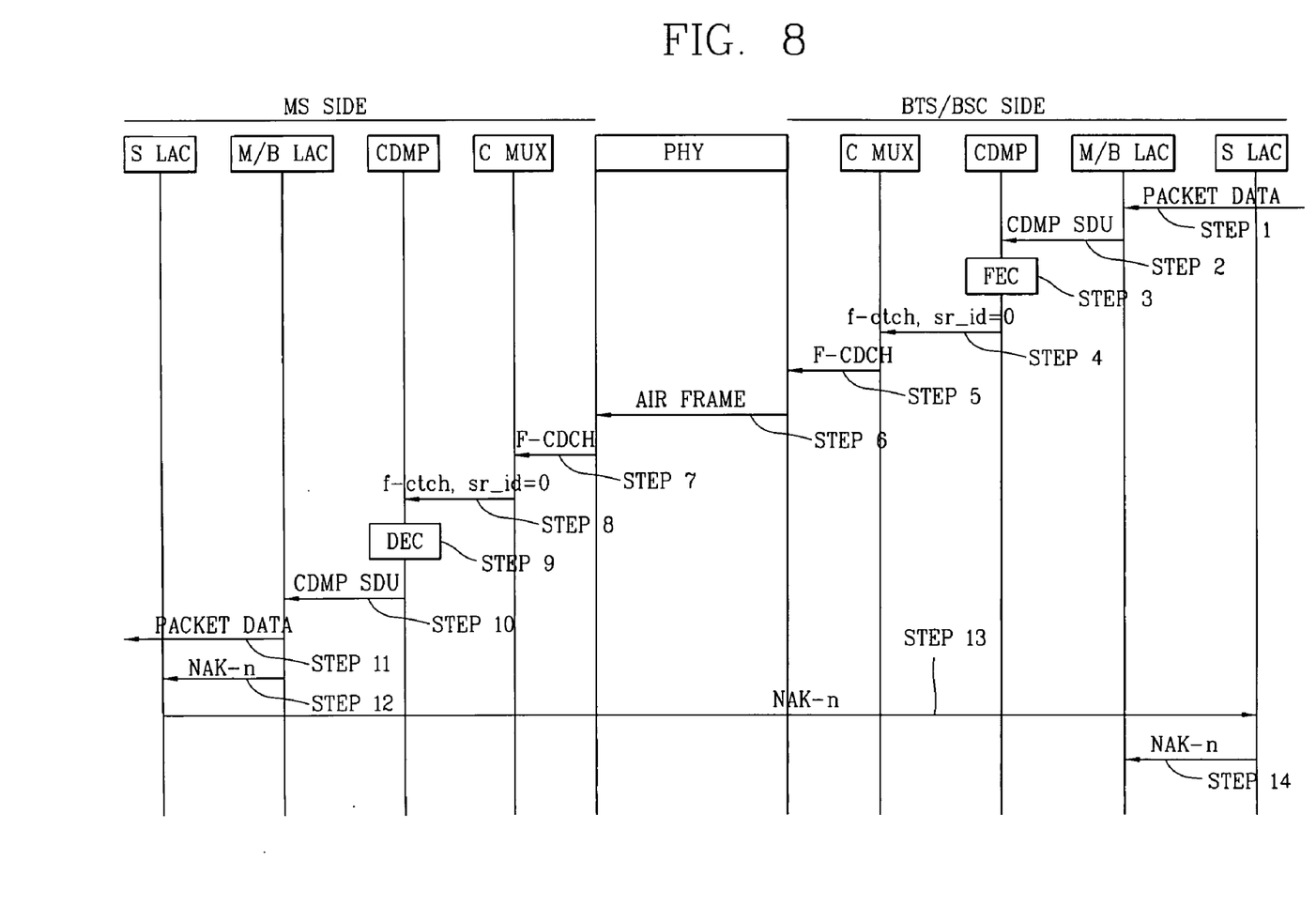
FIG. 8 illustrates a process flow chart of a packet data multicasting or broadcasting method in accordance with the preferred embodiment of the present invention.

FIG. 6 is a drawing illustrating an example of a packet broadcast/multicast data protocol architecture in accordance with the preferred embodiment of the present invention. FIG. 7 is a drawing illustrating an example of a multicast/broadcast LAC header and a multicast/broadcast MAC header in accordance with the preferred embodiment of the present invention. FIG. 8 is a flow chart of process of a packet data multicasting or broadcasting method in accordance with the preferred embodiment of the present invention.

The construction and transmission operation of each function object for a multicast transmission will now be described with reference to FIGS. 6, 7, and 8. When the PDSN receives multicasting data from the Internet server, the received multicasting data is transmitted to the plurality of BTSs through the BSCs/PCFs. The BTS transmits the received multicasting data to the data packet controller 100 and the data packet controller 100 outputs the multicasting data to the M/B LAC 110 (step 1).

Upon receipt of the multicasting data from the controller 100, the M/B LAC 110 adds a link header (LHD) to the received packet data and generates CDMP SDU data. And the M/B LAC 110 outputs the generated CDMP SDU data to the CDMP 120 (step 2). The link header preferably includes a sequence number of the CDMP SDU and multicast group identifier information.

The M/B LAC 110 stores the transmitted CDMP SDU data in the buffer for a predetermined time period. The M/B LAC 110 includes 16 buffers for storing the CDMP SDU. The predetermined time period is long enough to guarantee the transmission of the 16 frames to the MS and the reception of the NAK.

When the CDMP 120 receives the CDMP SDU data from the M/B LAC 110, it performs a forward error correction (FEC) coding and adds a redundancy to the data unit (step 3). The FEC uses a convolution coding, turbo coding, interleaving, or repetition method.

The CDMP 120 segments the encoding data into the maximum 16 CDMP PDUs (protocol data units). And then, the CDMP 120 adds the multicast header to each CDMP PDU and outputs it to the f-ctch 130 (step 4). The multicast header includes a sequence number and multicast group identifier information.

After receiving the packet through the f-ctch 130, the common channel multiplex sub-layer 140 segments the received packet into a size suitable for transmission to the F-CDCH 150, generates a single LTU by attaching a Mux-PDU type 3 header, of which 'sr_id' is set as '0' to each data block, and outputs the F-CDCH service data unit (SDU) to the F-CDCH 150 (step 5). The F-CDCH is a data unit consisting of 2 LTUs.

As a channel used when the BTS broadcasts data to every MS, at least one F-CDCH 150 should exist for every BTS sector in the service area of a BTS. The F-CDCH channel information is one channel that the MS can receive all the time through the f-csch of the BTS.

The M/B packet data outputted from the F-CDCH 150 of the BTS is transmitted to the MSs (step 6). The MSs receive only the data of the multicast group for which the MS itself has subscribed, among the received radio packet data.

In the case that there are more than two F-CDCHs in the MS and the BTS, the two F-CDCHs may be operated in such a manner that one is operated as a primary F-CDCH, for transmitting a normal multicast/broadcast packet, and the other is operated as a secondary F-CDCH for re-transmitting a transmission error packet.

The channel structure of the F-CDCHs 150 and 250 may have the same construction as that of the F-SCH defined by the 3GPP2 C.S0002-A standard, which is hereby incorporated by reference. A packet in a MuxPDU type 3 form can be transmitted through the channel to the MS.

The MuxPDU type 3 packet is defined in the C.S0003-A standard, which is hereby incorporated by reference, and may utilize a service reference identifier (sr_id) which is used to identify the multicast/broadcast packet and the unicast packet.

The CRC is added to the MuxPDU type 3 packet to constitute one logical transmission unit (LTU). Two LTUs makes one F-CDCH SDU.

The packet data transmitted to the physical layer through the F-CDCH 150 undergoes a predetermined process and is broadcast to the MS within a service area (step 6). And the radio signal received by the MS is restored to a F-CDCH SDU in the physical layer and outputted to the F-CDCH 250 (step 7).

The common channel multiplex sub-layer 240 removes the MuxPDU and the CRC from the F-CDCH SDU, received through the F-CDCH 250, and outputs the remaining data unit to the f-ctch 230.

The CDMP 220 checks the multicast group identifier of the CDMP PDU, received through the f-ctch 230, and receives only the CDMP PDU of the multicast group for which the corresponding MS has subscribed.

Then, the CDMP 220 aligns the received CDMP PDU in good order and performs an FEC decoding to restore the CDMP SDU (step 9). The restored CDMP SDU is outputted to the M/B LAC 210 (step 10).

Upon receipt of the CDMP SDU data through the CDMP 220, the M/B LAC 210 checks a sequence number to check whether a packet has been missed. If there is no missed packet, the M/B LAC 210 removes the link header contained in the CDMP SDU to extract the packet data. The extracted packet data is transmitted through the data packet controller 200 to the upper application service layer (step 11).

If a packet is missed, the M/B LAC 210 transmits a negative acknowledgment (NAK) signal, containing the sequence number and the multicast group identifier information of the corresponding packet, to a signaling LAC 260 (step 12). Then, the signaling LAC 260 transmits the NAK signal through a backward common signal channel (r-csch) 270 or an r-dsch 280 to the signaling LAC 160 of the BTS (step 13).

The signaling LAC 160 of the BTS transmits the received NAK signal to the LAC 110 (step 14). The M/B LAC 110 checks the sequence number and the multicast group identifier information of the packet to be re-transmitted and re-transmits the corresponding packet stored in the buffer to the MS. A re-transmission process of the packet is performed in the same manner described for steps 2~11.

With reference to FIG. 5 and the above description of the preferred embodiment, the substantial position of each function object and channel may be different depending on how they are implemented, rather than being fixed. That is, the BSC necessarily has the packet controller and the BTS necessarily has the physical channel, but the other channels and function objects in the middle process may exist in the BTS or the BSC according to a specific implementation.

As so far described, the multicast and broadcast transmission method of the preferred invention has many advantages. For example, by adding a channel and a radio protocol object for M/B data to the radio resource (MS-BTS) side, the load burden to the side of the wired resource (BTS-BSC/PCF-PDSN) is much reduced.

In addition, the high-speed packet data multicast/broadcasting is realized and the radio resource is more effectively used.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of performing a multicast and broadcast transmission, comprising:
   receiving multicast/broadcast (M/B) packet data of a different network server, transmitted from a packet data serving node (PDSN), without setting links between the PDSN and target mobile stations for a M/B transmission within a mobile communication network;
   temporarily storing the received M/B packet data, performing an error control procedure, and transmitting the received M/B packet data to a plurality of mobile stations through a M/B packet data dedicated channel;
   processing the M/B packet data by only the target mobile stations that are identified by header information of the received M/B packet data;
   identifying the M/B packet data and general packet data and setting an internal process routine by a data packet controller;
   receiving the M/B packet data from the data packet controller and outputting a cellular data multicasting protocol service data unit (CDMP SDU) by adding a link header to the M/B packet data;
   receiving the CDMP SDU, segmenting the CDMP SDU into a plurality of data units, and outputting a CDMP protocol data unit (PDU) generated by adding a multicast header to each separated data unit to a forward common traffic channel (f-ctch); and
   segmenting the CDMP PDU inputted through the f-ctch into a prescribed size and transmitting a forward common data channel (F-CDCH) SDU generated by adding a Mux header and a CRC code to each segmented data unit to the plurality of mobile stations through a forward common data channel (F-CDCH).

2. The method of claim 1, wherein the link header comprises identification information on the M/B packet data and unicast packet data.

3. The method of claim 1, wherein the link header comprises multicast group identifier information.

4. The method of claim 1, wherein the link header comprises a sequence number of the received M/B packet data.

5. The method of claim 1, wherein the inputted CDMP SDU is segmented to a maximum of 16 data units.

6. The method of claim 1, further comprising performing a forward error correction (FEC) coding.

7. The method of claim 1, wherein the multicast header comprises a sequence number of the received M/B packet data.

8. The method of claim 1, wherein the multicast header comprises multicast group identifier information.

9. The method of claim 1, wherein the CDMP SDUs are stored in a buffer for a predetermined time period.

10. The method of claim 1, wherein the F-CDCH SDU includes two local transmission units generated by adding the Mux header and the CRC code to each of the segmented data units.

11. A method of performing a multicast and broadcast transmission, comprising:
receiving multicast/broadcast (M/B) packet data of a different network server, transmitted from a packet data serving node (PDSN), without setting links between the PDSN and target mobile stations for a M/B transmission within a mobile communication network;
temporarily storing the received M/B packet data, performing an error control procedure, and transmitting the received M/B packet data to a plurality of mobile stations through a M/B packet data dedicated channel;
processing the M/B packet data by only the target mobile stations that are identified by header information of the received M/B packet data;
removing a Mux header and a CRC code from a forward common data channel (F-CDCH) service data unit (SDU) received through a F-CDCH;
extracting only CDMP protocol data units (PDUs) of a multicast group to which a corresponding mobile station has subscribed from a plurality of CDMP PDUs inputted through a forward common traffic channel (f-ctch);
removing a multicast header of the extracted CDMP PDUs;
generating a CDMP SDU block indicating that the extracted CDMP PDUs are aligned in good order;
receiving the CDMP SDU block and completing an original CDMP SDU block without omission of any data unit;
generating the M/B packet data without a link header by removing a link header contained in the CDMP SDU block; and
transmitting the M/B packet data to an upper application layer.

12. The method of claim 11, further comprising performing a forward error correction (FEC) decoding by cellular data multicasting protocol (CDMP).

13. The method of claim 11, further comprising checking a sequence number contained in the multicast header to align the M/B packet data.

14. The method of claim 11, further comprising checking multicast group identifier information contained in the multicast header, in order to extract only the CDMP PDUs of the multicast group to which the corresponding mobile station has been subscribed.

15. The method of claim 11, further comprising transmitting a negative acknowledgment (NAK) signal to a base station side for a re-transmission of a corresponding packet when an error occurs in packet transmission.

16. The method of claim 15, wherein the NAK signal comprises a sequence number and a multicast group identifier of the corresponding packet.

17. The method of claim 1, further comprising:
transmitting the M/B packet data from a cellular data multicasting protocol (CDMP) to a common channel multiplex sub-layer using a forward common traffic channel (f-ctch) as a logical channel; and
accessing multiple mobile stations of the plurality of mobile stations within a subscription area using a forward common data channel (F-CDCH) as a physical channel.

18. The method of claim 17, wherein at least one F-CDCH exists for each sector of a base station.

19. The method of claim 17, wherein if there are two F-CDCHs per sector of a base station, a first F-CDCH transmits a normal M/B packet and a second F-CDCH re-transmits a packet previously received with an error.

20. The method of claim 1, wherein a base station side of the mobile communication network comprises a base station transceiver subsystem and a base station controller.

21. The method of claim 1, wherein each of the target mobile stations requests re-transmission of a packet from a base station side if there is an error in the received M/B packet data.

22. The method of claim 1, further comprising:
transmitting the M/B packet data from a common channel multiplex sub-layer to a cellular data multicasting protocol using a forward common traffic channel (f-ctch) as a logical channel; and
receiving the M/B packet data that has been transmitted to a plurality of unspecified mobile stations by a base station side using a forward common data channel (F-CDCH) as a physical channel.

23. A base station of a mobile communication network, comprising:
a data packet controller that identifies multicast/broadcast (M/B) packet data and general packet data and sets an internal process routine;
an M/B link access controller (LAC) that receives the M/B packet data from the data packet controller and outputs a cellular data multicasting protocol service data unit (CDMP SDU), which is generated by adding a link header to the M/B packet data;
a CDMP that receives the CDMP SDU, segments the CDMP SDU into a plurality of data units, and outputs a CDMP protocol data unit (PDU), generated by adding a multicast header to each separated data unit, to a forward common traffic channel (f-ctch); and
a common channel multiplex sub-layer that segments the CDMP PDU inputted through the f-ctch into a prescribed size and transmits a forward common data channel (F-CDCH) SDU, generated by adding a Mux header and a CRC code to each segmented data unit, to the plurality of mobile stations through a forward common data channel (F-CDCH).

24. A mobile station, comprising:
a common channel multiplex sub-layer that removes a Mux header and a CRC code from a forward common data channel (F-CDCH) service data unit (SDU) received through a F-CDCH;
a cellular data multicasting protocol (CDMP) that extracts only CDMP protocol data units (PDUs) of a multicast group to which the mobile station has subscribed, among the CDMP PDUs inputted through a forward common traffic channel (f-ctch), removes a multicast header of the CDMP PDUs, and outputs a CDMP SDU block indicating that the CDMP PDUs are aligned;

an M/B link access controller (LAC) that receives the CDMP SDU block, completes an original CDMP SDU block without omitting a data unit, and outputs the M/B packet data without a link header, by removing the link header contained in the CDMP SDU block; and a data packet controller that transmits the M/B packet data received from the M/B LAC to an upper application layer.

25. The method of claim 1, wherein the prescribed size is a Mux PDU type 3 size.

26. The method of claim 9, wherein the F-CDCH SDU includes two local transmission units generated by adding the Mux header and the CRC code to each of the segmented data units.

27. A method of performing a multicast and broadcast transmission, comprising:

receiving multicast/broadcast (M/B) packet data of a different network server, transmitted from a packet data serving node (PDSN), without setting links between the PDSN and target mobile stations for a M/B transmission within a mobile communication network;

temporarily storing the received M/B packet data, performing an error control procedure, and transmitting the received M/B packet data to a plurality of mobile stations through a M/B packet data dedicated channel;

processing the M/B packet data by only the target mobile stations that are identified by header information of the received M/B packet data;

providing a cellular data multicasting protocol service data unit (CDMP SDU) by adding a link header to the M/B packet data;

segmenting the CDMP SDU into a plurality of data units;

providing a CDMP protocol data unit (PDU) by adding a header to each data unit;

segmenting the CDMP PDU inputted into a prescribed size; and transmitting a forward common data channel (F-CDCH) SDU generated by adding a Mux header and a CRC code to each segmented data unit to the plurality of mobile stations through a forward common data channel (F-CDCH).

28. A method of performing a multicast and broadcast transmission, comprising:

receiving multicast/broadcast (M/B) packet data of a different network server, transmitted from a packet data serving node (PDSN), without setting links between the PDSN and target mobile stations for a M/B transmission within a mobile communication network;

temporarily storing the received M/B packet data, performing an error control procedure, and transmitting the received M/B packet data to a plurality of mobile stations through a M/B packet data dedicated channel;

processing the M/B packet data by only the target mobile stations that are identified by header information of the received M/B packet data;

removing a Mux header and a CRC code from a forward common data channel (F-CDCH) service data unit (SDU) received through a F-CDCH;

extracting only CDMP protocol data units (PDUs) of a multicast group to which a corresponding mobile station has subscribed from a plurality of CDMP PDUs;

removing a multicast header of the extracted CDMP PDUs;

generating a CDMP SDU block; and generating the M/B packet data without a link header by removing a link header contained in the CDMP SDU block.

* * * * *